T. LESCARDÉ.
PRESERVING EGGS.
APPLICATION FILED MAR. 29, 1909.

1,011,352.

Patented Dec. 12, 1911.

Witnesses:
Fred White
René Bruine

Inventor:
Fernand Lescardé,
By Attorneys

UNITED STATES PATENT OFFICE.

TERNAND LESCARDÉ, OF PARIS, FRANCE.

PRESERVING EGGS.

1,011,352.  Specification of Letters Patent.  Patented Dec. 12, 1911.

Application filed March 29, 1909. Serial No. 486,570.

*To all whom it may concern:*

Be it known that I, TERNAND LESCARDÉ, a citizen of the Republic of France, residing in Paris, France, have invented certain new and useful Improvements in Preserving Eggs, of which the following is a specification.

The ordinary process for preserving eggs by refrigeration only keeps them good for 4 months; the improvement according to my invention insures that the eggs at the end of 10 months are as fresh in taste, as full and of as good appearance as they were when they were put under the preserving conditions. Moreover the invention does not entail any waste.

Figure 1:
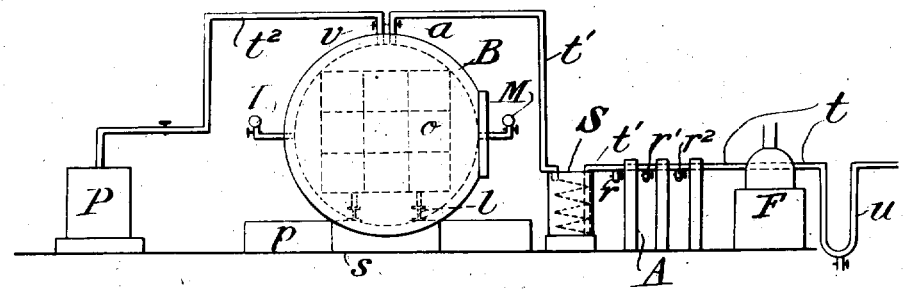
Figure 2:
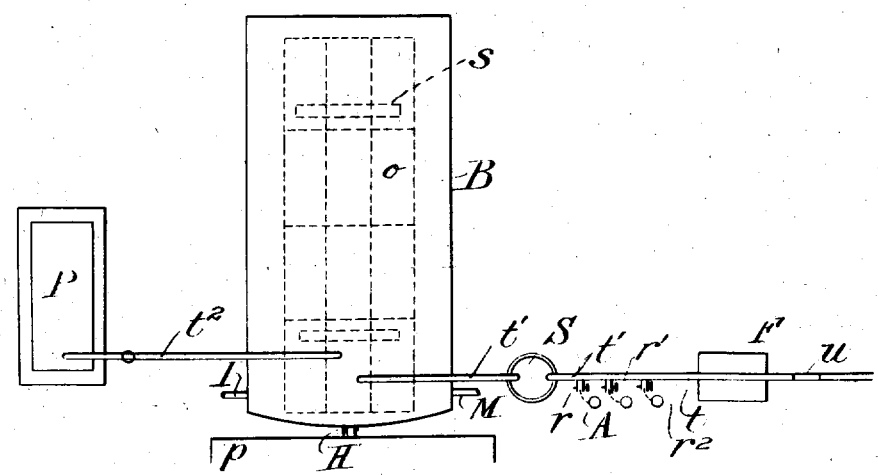

The accompanying drawings show diagrammatically in elevation in Figure 1 and in plan in Fig. 2 apparatus suitable for carrying out my invention.

This apparatus comprises a U-tube $u$ containing anhydrous calcium chlorid for drying the air; a furnace F or any equivalent apparatus for heating to redness a porcelain tube $t$ filled with copper; a pipe $t'$ in series with the said porcelain tube provided with cocks $r, r', r^2$ through which carbon dioxid can be admitted into the tube from bottles A of the liquefied gas; a vessel S containing a worm surrounded with hot or cold water so as to effect an exchange of temperature for heating the vaporized carbon dioxid and for cooling the nitrogen sterilized by the heat; a cylindrical autoclave B lying horizontally on foundations $s$ and containing wheeled carriages running on rails $l$ and constructed to receive the cases of eggs $o$; a pipe $t^3$ connecting the autoclave with a vacuum pump P; a platform $p$ on to which the carriages containing the eggs are run when they are removed from the autoclave; a manometer M; a vacuum indicator I; two cocks $v, a$ and a cleaning cock H fitted to the autoclave.

The eggs are placed in sheet iron boxes adapted to be hermetically closed, lined internally and coated externally with wooden slats; within each box is a tray containing anhydrous calcium chlorid to keep the atmosphere dry; the box is then closed hermetically with the exception of a small circular opening of 5 mm. diameter for the passage of gas; these boxes are then placed in the carriage which is introduced into the autoclave; the latter is hermetically closed and the treatment with carbon dioxid under pressure begins. For this purpose the autoclave is first pumped out, whereupon the carbon dioxid is admitted. The latter passes through the vessel S where it is heated before it gets access to the eggs; without this precaution the gas might break the shells owing to its low temperature produced by the volatilization of the liquid. The preliminary operation of pumping out the autoclave is necessary for depriving the eggs of all gases which they contain in solution, especially oxygen, and for making it possible to apply to them an atmosphere composed of an accurately measured mixture of 10% nitrogen and 90% carbon dioxid as hereinafter explained. When the pressure has attained a certain point which varies according to the freshness of the eggs the admission of gas is stopped and the action is allowed to proceed for a time depending on the condition of freshness of the eggs. When this treatment is finished the pressure in the autoclave is allowed to decrease until it has attained that of the atmosphere and the following operation is performed: By means of the vacuum pump the gas is pumped out of the autoclave so as to diminish the pressure to about 70 cms. of water, the cocks $r, r'$ and $r^2$ and $a$ are then opened whereupon outside air is drawn in through a porcelain tube $t$ after traversing the tube $u$ where it is dried; in the porcelain tube containing the red hot copper turnings the air yields its oxygen so that nothing passes into the autoclave except the sterilized nitrogen, cooled by passing through the vessel S. The pressure having again risen in the autoclave to that of the atmosphere the cocks $r, r'$, and $r^2$ and $a$ are closed. The eggs are thus surrounded by an atmosphere consisting of the inert gas, nitrogen, containing carbon dioxid. The carriage is now removed from the autoclave and the small openings in the boxes are sealed up. The boxes are then conveyed to a refrigerating chamber in which, by any usual or suitable means, a temperature of very near 0° C. is maintained, averaging +1° C. The effect of such an atmosphere is to prevent the development of the bacteria which might have escaped from the sterilizing action of carbon dioxid, and also to hinder the fermentation of a true chemical character.

Having thus described the nature of my invention and the best means I know of carrying the same into practical effect, I claim:

A process for preserving eggs which consists in placing them in a receptacle, exhausting the air therefrom, submitting them for a time to the action of pure carbonic acid in order to destroy existing bacteria and thereafter adding nitrogen to form a mixture with the carbonic acid, sealing the receptacle and thereafter maintaining the receptacle containing the eggs and gaseous mixture at a temperature approximately 0° C. and averaging about +1° C. during the entire period that the eggs are to be preserved.

In witness whereof, I have hereunto signed my name in the presence of two subscribing witnesses.

TERNAND LESCARDÉ.

Witnesses:
ELLWOOD AUSTIN WELDEN,
GABRIEL BELLIARD.

---

Correction in Letters Patent No. 1,011,352.

It is hereby certified that in Letters Patent No. 1,011,352, granted December 12, 1911, for an improvement in "Preserving Eggs," the name of the patentee was erroneously written and printed "Ternand Lescardé," whereas said name should have been written and printed *Fernand Lescardé;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.* invention and the best means I know of carrying the same into practical effect, I claim:

A process for preserving eggs which consists in placing them in a receptacle, exhausting the air therefrom, submitting them for a time to the action of pure carbonic acid in order to destroy existing bacteria and thereafter adding nitrogen to form a mixture with the carbonic acid, sealing the receptacle and thereafter maintaining the receptacle containing the eggs and gaseous mixture at a temperature approximately 0° C. and averaging about +1° C. during the entire period that the eggs are to be preserved.

In witness whereof, I have hereunto signed my name in the presence of two subscribing witnesses.

TERNAND LESCARDÉ.

Witnesses:
ELLWOOD AUSTIN WELDEN,
GABRIEL BELLIARD.

---

Correction in Letters Patent No. 1,011,352.

It is hereby certified that in Letters Patent No. 1,011,352, granted December 12, 1911, for an improvement in "Preserving Eggs," the name of the patentee was erroneously written and printed "Ternand Lescardé," whereas said name should have been written and printed *Fernand Lescardé;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.*

It is hereby certified that in Letters Patent No. 1,011,352, granted December 12, 1911, for an improvement in "Preserving Eggs," the name of the patentee was erroneously written and printed "Ternand Lescardé," whereas said name should have been written and printed *Fernand Lescardé;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.*